May 25, 1954
R. F. SMELTZER
SUPERREGENERATIVE DETECTOR OF
FREQUENCY MODULATED SIGNALS
Filed Aug. 23, 1948
2,679,583
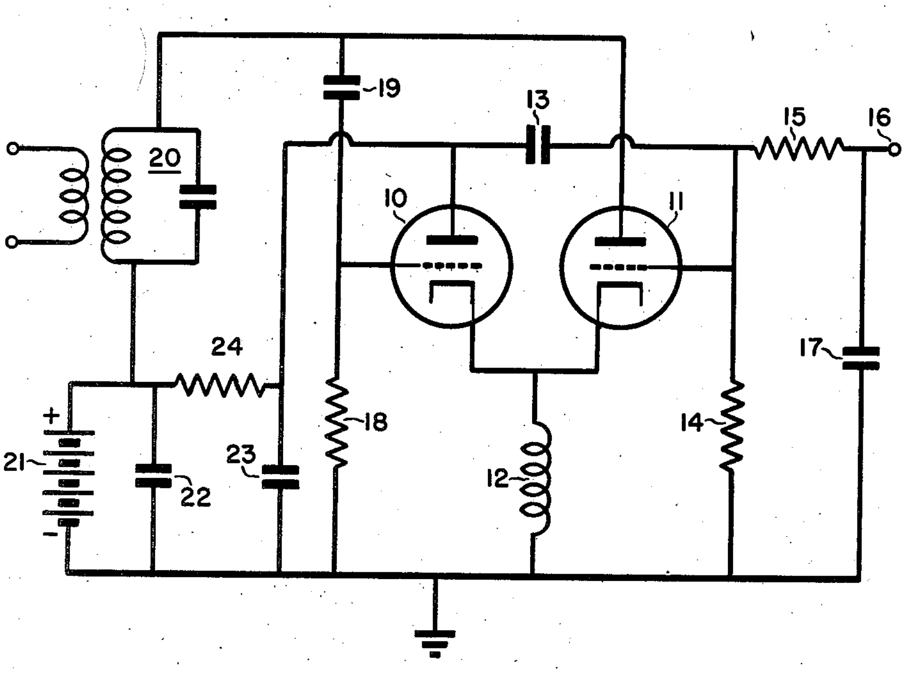
Inventor
RAYMOND F. SMELTZER
By Robert T. Killman
Attorney Patented May 25, 1954 2,679,583

UNITED STATES PATENT OFFICE 2,679,583

SUPERREGENERATIVE DETECTOR OF FREQUENCY MODULATED SIGNALS

Raymond F. Smeltzer, Towson, Md., assignor to Bendix Aviation Corporation, Towson, Md., a corporation of Delaware Application August 23, 1948, Serial No. 45,734

12 Claims. (Cl. 250—27)

This invention is directed to super-regenerative detectors. More specifically it is directed to super-regenerative detectors suitable for use as detectors of frequency modulated wave signal energy.

The conventional FM detector is preceded by a discriminator circuit which delivers to the detector an R. F. voltage proportional, in part, to the instantaneous frequency of the applied signal. The output of such a detector is generally a function of both the frequency and the amplitude of the applied signal, and, if rejection of amplitude-modulation signals, such as noise transients, is desired, a limiter must be used. This limiter and its attendant electrical circuits increase the complexity of the receiver by a large factor.

It is an object of this invention to provide an FM detector the output signal of which is substantially independent of amplitude-modulation components of its input signal.

This object is attained by the use of a super-regenerative detector of the multivibrator type employing two sets of triode vacuum tube elements in conjunction with a parallel resonant circuit.

Other and further objects and advantages of this invention will become apparent from the following detailed description when the same is read in connection with the accompanying drawing wherein there is illustrated a detector in accordance with the instant invention.

Referring now to the drawing, there is illustrated a pair of triode vacuum tubes 10 and 11 having their respective cathodes tied together and that junction connected to ground through an inductor 12 which is broadly resonated with stray capacities in the band to be covered. The anode of the tube 10 is connected to ground through a series circuit comprising a condenser 13 and a resistor 14. The control electrode of the tube 11 is connected to the junction of the condenser 13 and the resistor 14, and thence through a resistor 15 to an output terminal 16 which is connected to ground through a condenser 17. The control electrode of the tube 10 is connected to ground through a resistor 18 and to the anode of the tube 11 through a condenser 19. The anode of the tube 11 is connected through a parallel resonant circuit 20 to the positive terminal of a source of potential 21, the negative terminal of which is connected to ground. A condenser 22 is connected in shunt with the terminals of the source 21. The anode of the tube 10 is connected to ground through a condenser 23 and to the positive terminal of the source 21 through a resistor 24.

At signal frequencies tube 10 operates as a cathode follower, coupled by means of the common impedance 12 to tube 11 which operates as a grounded grid amplifier. When the anode of tube 11 is coupled to the control element of tube 10, as by the capacitor 19, a connection to either of these electrodes will appear as a negative resistance with respect to the ground side of the circuit under any conditions for which the in-phase loop gain is greater than unity. Consequently, when a parallel resonant circuit 20 is connected as shown, it will oscillate when the loop gain, including it as a coupling element, is equal to unity. The basic circuit is shown as Fig. 14 on p. 706 of the Proc. I. R. E. for October, 1945, and is discussed in the accompanying text.

The network composed of elements 13, 14, 23 and 24 couples the control grid of tube 11 to the anode of tube 10 at the quench frequency, after the fashion of an incomplete multivibrator circuit. Capacitor 23 is primarily a bypass for current in the frequency range of the resonant circuit 20, and only incidentally affects the frequency of relaxation oscillations. However, to permit relaxation oscillations to occur, an additional coupling is required such as will allow variation of the space current of tube 11 to influence the space current of tube 10 in the opposite direction. No such coupling of adequate magnitude is directly present in the circuit, but an equivalent coupling is obtained when conditions are established which cause violent oscillation of the resonant circuit 20. Under such conditions, both tubes are non-linear devices and when the time constant of the grid circuit of the tube 11 is made significantly shorter than that of tube 10, tube 11 serves as a modulator of the oscillations and tube 10 as a demodulator, thus completing the multivibrator circuit. The role of the high frequency oscillation as a carrier may be easily demonstrated by damping the resonant circuit 20 until oscillation ceases, whereupon the multivibrator action also ceases, only to be resumed when a carrier of sufficient amplitude is applied from an external source, in which case the signal amplitude developed across circuit 20 will be observed to be modulated as required by the theory.

In normal operation, the grid of tube 10 acquires a bias approximately equal to the peak amplitude of the high frequency oscillation of circuit 20, which bias may, for all practical purposes, be assumed to remain constant. Since this tube must be conducting to produce a regenerative increase of any small signal, the bias necessarily will be within the cutoff value, and since it must act as an anode bend demodulator for large amplitudes of the high frequency oscillation, the bias must be more than half the cutoff value. During the regenerative increase of amplitude of the high frequency oscillation both the average space current and average transconductance of tube 10 will increase with the oscillation amplitude, the increase in space current becoming very rapid as the oscillation approaches its peak amplitude.

During the early part of the regenerative increase of amplitude of oscillation of circuit 20, rectification of the oscillation in the grid-cathode space of tube 11 replaces that portion of the charge which has leaked off capacitor 13 since the previous oscillation, so that the negative bias on the grid of tube 11 increases with the amplitude of oscillation, after the amplitude of the oscillation developed across impedance 12 exceeds the bias remaining from the previous oscillation period. As in tube 10, the average space current and transconductance of tube 11 will increase with the oscillation amplitude during this period. However, as the oscillation amplitude nears its peak and the average space current of tube 10 increases rapidly, a corresponding increase in the drop across resistor 24 occurs which is transferred through the coupling capacitor 13 to the grid of tube 11 as a negative pulse which drives the grid far beyond cutoff. The feedback loop is interrupted by this space current cutoff and the amplitude of oscillation of circuit 20 immediately begins to fall exponentially, with the result that the anode current of tube 10 and the drop across resistor 24 decreases. The negative pulse conveyed to the grid of tube 11 through capacitor 13 likewise collapses, but the delay in the rise and fall of the pulse occasioned by the presence of capacitor 23 prevents the immediate resumption of conditions necessary for continued oscillation. The incremental charge just received by capacitor 13 through rectification in the grid-cathode circuit of tube 11 decays through the resistive paths connecting the capacitor plates until the bias on the grid of tube 11 falls to the point where the loop gain is again greater than unity, whereupon the cycle is initiated anew with a regenerative increase in the amplitude of any noise or signal oscillations present in the circuit 20. No trace of the previously generated oscillation will be found in circuit 20 regardless of the quiescent Q of the circuit because it is heavily damped by the anode-cathode circuit of tube 10 immediately following the relaxation of the negative pulse on the grid of tube 11 but before its transconductance reaches the value at which regeneration occurs. As an example, using a circuit having a Q of 220 at 93.3 mc., the oscillation reached its peak amplitude in approximately $0.5\times10^{-6}$ second and decayed from this amplitude to the circuit noise level in approximately $1.6\times10^{-6}$ second. Since the observing equipment modified the results, there is reason to believe that the rise may have occurred in approximately $0.2\times10^{-6}$ second and the decay in approximately $1.9\times10^{-6}$ second in the absence of the observing equipment. In either case, the oscillation occupied only 21% of the $10^{-5}$ second period of the entire cycle of events. The form and duration of the pulses observed at other significant points in the system are in accord with the second set of values.

A sort of reproduction of the modulation of a carrier to which circuit 20 is nearly tuned may be observed by use of a peak rectifier coupled to the tuned circuit 20 or to the impedance 12, or by a quench frequency filter connected across the resistor 24, but the circuit will then be found to exhibit the typical multiple responses, distortion and noise common to super-regenerative receivers. In common with other self-quenched super-regenerative receivers, the rise time of the oscillation decreases as the amplitude of the incoming signal increases, so some reproduction of amplitude modulation will be evident at the points mentioned above, but it will be much less evident than with conventional self-quenched super-regenerators because the rise time is such a small portion of the period of the quench cycle that any variation of the rise time met in practice can produce only a minute variation of the total quench period.

Superficially, it might appear that the average value of the bias acquired by the grid of tube 11, through rectification of the oscillation and storage of the rectification products in capacitor 13, would be proportional to the quench frequency and that the bias would consequently vary with the envelope of an amplitude modulated signal after the fashion of any super-regenerator operating in the logarithmic mode. In practice, however, rectification at the grid of tube 11 ceases at a definite amplitude of oscillation of circuit 20 regardless of the amplitude of the initiating signal and the bias decays to a fixed level before regenerative buildup begins anew. Since the bias varies between two fixed limits for any given signal frequency according to an unchanging law, its median or average value will also be constant. The only limitation on the amplitude of the initiating signal is that it should not exceed the amplitude at which tube 10 cuts off tube 11 at the moment that the gain around the regenerative loop becomes unity.

When the frequency of the initiating signal is varied, the average value of the bias on the grid of tube 11 will decrease as the signal frequency departs in either direction from the frequency of oscillation of the tuned circuit 20. Regardless of the frequency of the initiating signal, the frequency of oscillation becomes that of the tuned circuit 20 as the amplitude increases, with the result that tube 10 operates to cutoff tube 11 at an unvarying amplitude of oscillation and the peak bias potential attained by the grid of tube 11 is therefore independent of the frequency as well as the amplitude of the initiating signal. The regenerative rise in amplitude begins at the frequency of the initiating signal, and during this initial stage the gain of the regenerative loop is constantly increasing as the charge leaks off capacitor 13 and the bias of the grid of tube 11 falls. The loop gain is not, however, simply a function of this grid bias, but rather, is a function of both the bias and the frequency of the signal which is being regeneratively amplified since the tuned circuit 20 is one of the coupling elements of the feedback loop. As the frequency of the initiating signal departs from the resonant frequency of the tuned circuit 20, the efficacy of the latter as a coupling element between the anode of tube 11 and the grid of tube 10 decreases and the bias on the grid of tube 11 must decay to lower values to attain any given loop gain. Since only the component of feedback which is in phase with the initiating signal is effective to produce a regenerative increase in the initiating signal, phase shift as well as impedance variation operates to control the inphase component of loop gain. When both factors are taken into account, it is found that the change in the average value of the bias on the grid of tube 11 is very precisely a linear function of the departure of the frequency of the initiating signal from the resonant frequency of the tuned circuit 20. The apparent selectivity curve as measured by a plot on a linear scale of the change of average bias of this grid against the signal frequency is a symmetrical V having straight sides, joined by a very brief curved section. Nearly faultless reception of a frequency modulated signal may be had by using either side as a translation slope, provided only that the ratio of the initiating signal amplitude to circuit and other noise potentials is greater than the ratio of transmission by the tuned circuit of inphase oscillations at resonance to that at the maximum deviation of the signal from resonance. There is no apparent response to a signal beyond these limits, except that a large signal beyond the limits may reduce the response to circuit noise. None of the usual side responses are evident, nor is there any indication of response to amplitude variations through the range from circuit noise level up to the level which makes the operation of tube 10 sufficiently nonlinear that it cuts off tube 11.

For operation at 93.3 mc. the following values of the various components have been found to be most satisfactory:

| | |
|---|---|
| Condenser 13 | 100 mmfd. |
| Resistor 14 | 150,000 ohms |
| Resistor 15 | 220,000 ohms |
| Condenser 17 | 470 mmfd. |
| Resistor 18 | 6,800,000 ohms |
| Condenser 19 | 100 mmfd. |
| Condenser 22 | .001 mfd. |
| Condenser 23 | 47 mmfd. |
| Resistor 24 | 10,000 ohms |

This circuit provides an excellent single response selectivity curve at 93.3 mc. which is about 600 kc. wide and which will accommodate an FM signal 200 kc. wide on the linear portion of either slope. The audio frequency signal appearing at the output terminal 16 is substantially independent of the amplitude of the input signal, and the translation slope of frequency vs. output is virtually linear.

What is claimed is:

1. Means for the demodulation of a frequency or phase modulated signal comprising a two-stage, regenerative, cathode coupled amplifier, each of said stages having an input and an output circuit, a resonant circuit coupled to the input circuit of the first of said stages and to the output circuit of the second of said stages, means coupling the input circuit of the second of said stages to the output circuit of the first of said stages and providing a low impedance path to the frequency of said resonant circuit, the input circuit of said second stage having a time constant which is less than the time constant of the input circuit of the first of said stages, means coupling said signal to said resonant circuit, and an output circuit for said demodulation means responsive to an integral of the instantaneous energy levels in the input circuit of said second stage.

2. Means for the demodulation of a frequency or phase modulated signal comprising a two-stage, regenerative, cathode coupled amplifier, each of said stages having an input and an output circuit, a resonant circuit coupled to the input circuit of the first of said stages and to the output circuit of the second of said stages, a capacitance-resistance network coupling the input circuit of the second of said stages to the output circuit of the first of said stages and providing a low impedance path to the frequency of said resonant circuit, the input circuit of said second stage having a time constant which is less than the time constant of the input circuit of the first of said stages, means coupling said signal to said resonant circuit, and an output circuit for said demodulation means responsive to an integral of the instantaneous energy levels in the input circuit of said second stage.

3. Means for the demodulation of a frequency or phase modulated signal comprising a pair of cathode coupled, self-biased, electron discharge tubes, means coupling the output of each of said tubes to the input of the other, a parallel resonant circuit coupled to the input of the first of said tubes, means providing across the output of said first tube a path having a low impedance at the frequency of said resonant circuit, the input circuit of the second of said tubes having a time constant which is less than that of the input circuit of said first tube, means coupling said signal to said resonant circuit, and an output circuit for said demodulation means responsive to an integral of the instantaneous energy levels in the input circuit of said second tube.

4. Means for the demodulation of a frequency or phase modulated signal comprising a pair of electron discharge tubes; each having an anode, a cathode and a control electrode; a common impedance connected from said cathodes to ground; a resonant circuit coupled to the control grid of the first of said tubes and to the anode of the second of said tubes; a resistance-capacitance network coupling the control electrode of the second of said tubes to the anode of the first, and to ground; resistance means coupling the control electrode of said first tube to ground, said network providing a low impedance to the frequency of said resonant circuit between the control electrode of said second tube and ground, the time constant of the circuit connections to the control electrode of said second tube being less than the time constant of the circuit connections to the control electrode of said first tube; means coupling said signal to said resonant circuit, and an output circuit for said demodulation means responsive to an integral of the instantaneous energy levels impressed upon the control electrode of said second tube.

5. Means for the demodulation of a frequency or phase modulated signal comprising a two-stage, cathode coupled amplifier each of said stages having an input and an output circuit, means coupling the output of the first of said stages to the input of the second, a tuned regenerative loop coupling the output of the second of said stages to the input of the first, said loop having a sloped response at the frequency of said signal, means coupling said signal to said loop, an output circuit for said demodulation means responsive to an integral of the instantaneous energy levels in the input circuit of said second stage.

6. Means for the demodulation of a frequency or phase modulated signal comprising a two-stage, cathode coupled amplifier, each of said stages having an input and an output circuit, self biasing means in the input circuits of each of said stages, a network coupling the output of the first of said stages to the input of the second, a tuned regenerative loop coupling the output of the second of said stages to the input of the first, said loop having a sloped response at the frequency of said signal, means coupling said signal to said loop, said network having a low impedance at the frequency of said signal, and an output circuit for said amplifier responsive to an integral of the instantaneous values of bias developed by the self-biasing means of the second of said stages.

7. Means for the demodulation of a frequency or phase-modulated signal comprising a two-stage, cathode coupled amplifier, each of said stages having an input and an output circuit, means coupling the output of the first of said stages to the input of the second, a regenerative loop coupling the output of the second of said stages to the input of the first, said loop including a tuned circuit, means coupling said signal to said tuned circuit, the frequency of said signal lying on the slope of the response curve of said tuned circuit, and an output circuit for said amplifier, responsive to an integral of the energy levels in the input circuit of said second stage.

8. In a super-regenerative receiver system responsive to angle modulation of a carrier wave: a tuned oscillator circuit including a regenerative feedback loop, means controlling the gain of said feedback loop, said gain controlling means comprising an energy storage means responsive to the oscillations traversing said feedback loop and means responsive to the energy stored by said storage means to vary the gain of said feedback loop inversely with respect to variations in the level of said stored energy, means coupling angle modulated oscillatory energy to said tuned oscillator circuit, said oscilaltory energy having a mean frequency lying on one slope of the resonance curve of said oscillator circuit, and an output circuit responsive to an integral of the instantaneous levels of energy stored in said energy storage circuit.

9. In a super-regenerative receiver system responsive to angle modulation of a carrier wave: a tuned oscillator circuit including a regenerative feedback loop, means responsive to the amplitude of oscillations traversing said feedback loop for interrupting said feedback loop when said oscillations attain a limited amplitude and gradually restoring said feedback loop to operation following said interruption, said means including a peak rectifier for said oscillations and a load circuit for said rectifier having a time constant large compared to the period required for regenerative increase of said oscillations to said limited amplitude, and an output circuit responsive to an integral of the potential produced across said load circuit by said rectifier.

10. In a super-regenerative receiver system responsive to angle modulation of a carrier wave: a circuit for the production of relaxation oscillations comprising a tuned circuit, an amplifier, means coupling said tuned circuit between the input and output circuits of said amplifier and forming with said tuned circuit and said amplifier a regenerative feedback loop, and means controlling the gain of said feedback loop, said gain controlling means comprising an energy storage means responsive to the oscillations traversing said feedback loop and means responsive to the energy stored by said storage means to vary the gain of said feedback loop inversely with respect to variations in the magnitude of said stored energy; means coupling angle modulated oscillatory energy to said tuned circuit, said oscillatory energy having a mean frequency lying on one slope of the resonance curve of said tuned circuit, and an output circuit responsive to an integral of the instantaneous levels of energy stored in said energy storage circuit.

11. In a self-quenched super-regenerative receiver system responsive to angle modulation of a carrier wave: a tuned oscillation generator including a regenerative feedback loop, means coupling said angle modulated carrier wave to said feedback loop, an oscillation quenching circuit in said feedback loop comprising an energy storage means responsive to the oscillations occurring in said tuned oscillation generator, said energy storage means having a decay time constant greater than the decay time constant of said tuned oscillation generator, and modulation recovery means comprising a resistor and a capacitor serially connected across said energy storage means and output terminals for deriving the output of said system connected across said capacitor.

12. In a receiving system responsive to angle modulation of a carrier wave: a self-quenched super-regenerative generator of oscillations differing slightly in frequency from any frequency of said carrier wave, means coupling said angle modulated carrier wave to said generator, said generator including a quenching means comprising an energy storage means operable to interrupt the generation of said oscillations upon the attainment of a fixed amplitude of said oscillations, and modulation recovery means comprising a resistor and a capacitor serially connected across said energy storage means and output terminals for deriving the output of said system connected across said capacitor.

References Cited in the file of this patent

UNITED STATES PATENTS

| Number | Name | Date |
|---|---|---|
| 2,286,377 | Roberts | June 16, 1942 |
| 2,323,596 | Hansell | July 6, 1943 |
| 2,373,616 | Sziklai | Apr. 10, 1945 |
| 2,414,992 | Wheeler | Jan. 28, 1947 |
| 2,419,772 | Gottier | Apr. 29, 1947 |
| 2,429,513 | Hansen | Oct. 21, 1947 |
| 2,465,782 | Bartelink | Mar. 29, 1949 |
| 2,497,290 | Bradley | Feb. 14, 1950 |
| 2,589,455 | Tellier | Mar. 18, 1952 |